United States Patent [19]
Fukuda

[11] Patent Number: 5,898,666
[45] Date of Patent: Apr. 27, 1999

[54] METHOD AND SYSTEM FOR BIDIRECTIONAL DATA TRANSMISSION

[75] Inventor: Misao Fukuda, Kawasaki, Japan

[73] Assignee: Fujitsu Limited, Kawasaki, Japan

[21] Appl. No.: 08/640,313

[22] Filed: Apr. 30, 1996

[30]    Foreign Application Priority Data

Sep. 21, 1995    [JP]    Japan ................................. 7-242668

[51] Int. Cl.⁶ ................................. H04J 3/00; H04L 5/16
[52] U.S. Cl. ......................... 370/280; 370/294; 370/521; 370/535
[58] Field of Search ................................. 370/280, 282, 370/294, 465, 468, 474, 521, 535; 375/219, 240; 348/384, 390

[56]    References Cited

U.S. PATENT DOCUMENTS

| | | | |
|---|---|---|---|
| 4,467,473 | 8/1984 | Arnon et al. | 370/294 |
| 4,476,558 | 10/1984 | Arnon | 370/294 |
| 4,525,835 | 7/1985 | Vance et al. | 370/280 |
| 4,750,169 | 6/1988 | Carse et al. | 370/538 |
| 5,001,703 | 3/1991 | Johnson et al. | 370/280 |
| 5,347,304 | 9/1994 | Moura et al. | 370/463 |
| 5,586,121 | 12/1996 | Moura et al. | 370/276 |

*Primary Examiner*—Alpus H. Hsu
*Attorney, Agent, or Firm*—Staas & Halsey

[57]    ABSTRACT

A method of bidirectional data transmission with a single transmission line using a time-compression multiplexing method, which is configured to allow a downstream channel capacity to be higher than an upstream channel capacity. In a bidirectional communication system, a master unit and a slave unit exchange data alternately in the time-compression mode. The method, according to the present invention, sets a downstream data transmission time, tm, for data transmission from the master unit to the slave unit is set longer than an upstream data transmission time, ts, for the opposite direction. As a result, the downstream data rate (or the amount of data transferred in the downstream direction per unit time) becomes larger than the upstream data rate.

8 Claims, 15 Drawing Sheets

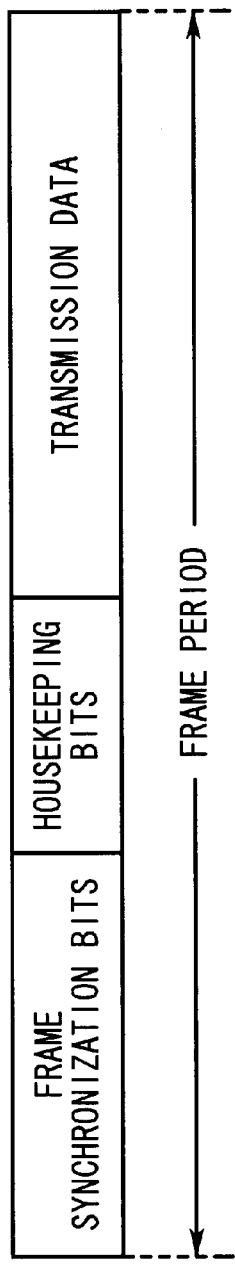
FIG. 7(A) STRUCTURE OF DOWNSTREAM TRANSMISSION DATA FRAME
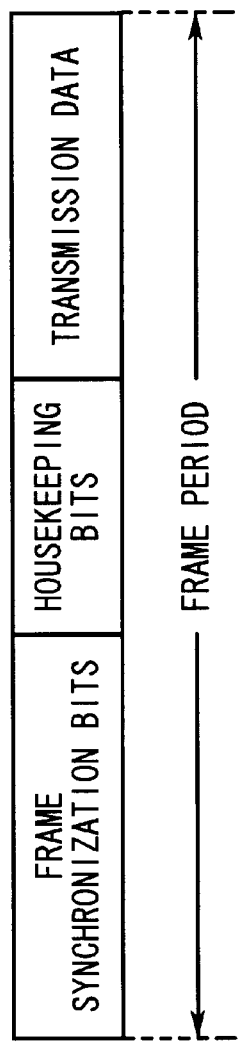
FIG. 7(B) STRUCTURE OF UPSTREAM TRANSMISSION DATA FRAME

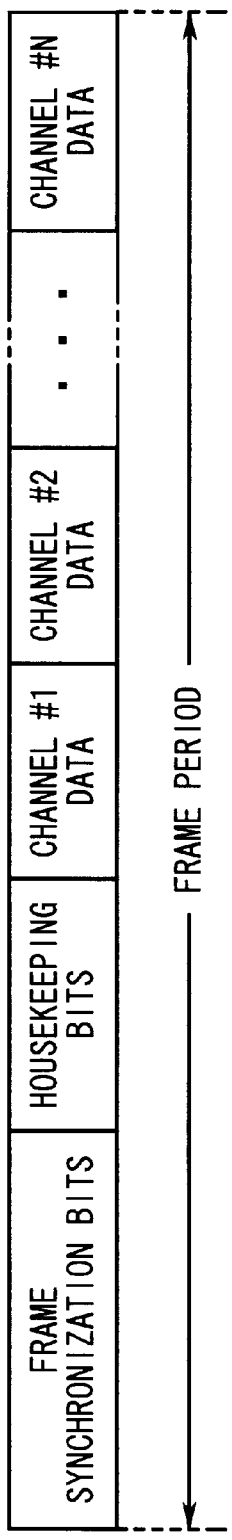
FIG. 11 (A)  STRUCTURE OF DOWNSTREAM TRANSMISSION DATA FRAME
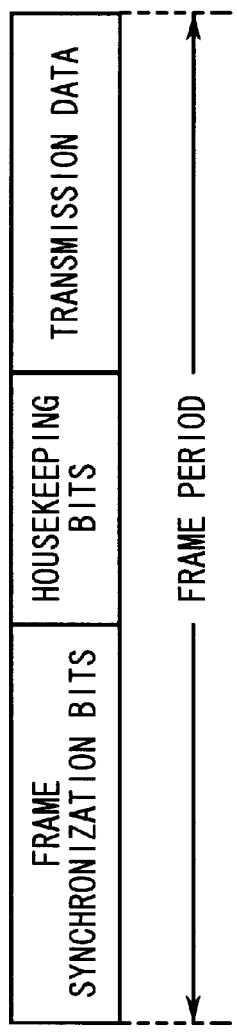
FIG. 11 (B)  STRUCTURE OF UPSTREAM TRANSMISSION DATA FRAME

METHOD AND SYSTEM FOR BIDIRECTIONAL DATA TRANSMISSION

BACKGROUND OF THE INVENTION

1. Field of the Invention

The present invention relates to a method and system for bidirectional data transmission using a single transmission line, and more specifically, to a method and system for bidirectional data transmission by a time-compression multiplexing technique.

2. Description of the Related Art

As video-on-demand (VOD) services become a topic of interest today, such technologies are under study that distribute video information to subscriber premises using existing data transmission media. Transmission lines for this purpose include a single optical fiber, coaxial cable, or metallic two-wire cable, which will carry data from an information service provider to subscribers. (Hereafter, the data direction from the provider to the subscribers will be called "downstream direction," and the other direction will be called "upstream direction.")

There are several methods of full-duplex subscriber loop communications using a single metallic two-wire cable that are presently available. A time-compression method (also known as a "ping-pong" method) and an echo cancellation method are well-known techniques that enable such communications.

FIG. 14 is a block diagram showing a basic structure of the "ping-pong" transmission system for the Integrated Services Digital Network (ISDN). A transmission line 2 is terminated at both ends by a master unit 50 and a slave unit 60. The master unit 50 is communication equipment for providing information such as video data, and the slave unit 60 is communication equipment located at each subscriber's premise for receiving the information.

For data transmission purposes, the master unit 50 employs a data rate converter 51 for stepping up the transmission data signaling rate and a transmitter circuit 54 for amplifying the transmission data signal with increased data rate. For data reception purposes, the master unit 50 employs a receiver circuit 55 for receiving and amplifying an incoming data signal from the transmission line 2 and a data rate converter 53 for stepping down the data signaling rate of the received data signal. Based on its internal clock, a transmission/reception (TX/RX) controller 52 provides a timing control for switching between transmission and reception modes. Under the control of this TX/RX controller 52, a switch 56 alternates the signal transmission and reception.

The slave unit 60, on the other hand, employs a data rate converter 61 for stepping up the transmission data signaling rate and a transmitter circuit 64 for amplifying the accelerated transmission data signal for data transmission. For data reception purposes, the slave unit 60 employs a receiver circuit 65 for receiving and amplifying an incoming data signal from the transmission line 2 and a data rate converter 63 for stepping down the data rate of the received data signal. A TX/RX controller 62 provides a timing control for switching the signal transmission and reception in the slave unit 60 in synchronization with the TX/RX switching in the master unit 50. Under the control of this TX/RX controller 62, a switch 66 alternates the signal transmission and reception.

With the above-described system, the master unit 50 can deliver the video information and other data.

FIG. 15 is a diagram showing transmission signals in a ping-pong transmission system, in which the downstream transmission signal is sent from the master unit 50 (FIG. 14) as an information service provider to the slave unit 60 as an end-user and the upstream transmission signal is sent in the other direction. FIG. 15 shows some burst data transmission cycles, each of which consists of one upstream signal transmission period and one downstream signal transmission period.

In this data transmission system, the downstream and upstream signal transmission periods have the same length. This means that the signals are transferred on the downstream and upstream paths at the same data rate.

One of the prime objects of VOD systems is delivery of video information to subscribers. Therefore, from the viewpoint of efficient use of a limited capacity of the data transmission system, the downstream channel capacity should preferably be larger than the upstream channel capacity. However, the above-described ping-pong method is not always suitable for the VOD services, since the downstream and upstream channel capacities are designed to be symmetric for more general applications such as ISDN.

For adaptation to a wide variety of services, asymmetric data transmission systems are demanded, because they can assign a higher capacity to the downstream channel than to the upstream channel. For example, Asymmetric Digital Subscriber Lines (ADSL) architecture is under development for future use in North America. With a frequency-division multiplexing technique, this ADSL will provide a higher downstream channel capacity over existing subscriber loops.

In the VOD systems that apply such a frequency-division multiplexing technique to data transfer over a single transmission line, the downstream channel uses much wider bandwidth than the upstream channel. The wider bandwidth makes the downstream channel capacity higher than that of the upstream channel, thus enabling the VOD systems to achieve its prime object (i.e., delivery of video-based information to subscribers).

On the other hand, however, large scale hardware is necessary to realize the asymmetric bidirectional data transfer by using conventional frequency-division multiplexing techniques including ADSL, and this will lead to a cost problem. As a matter of fact, some of the optical fiber-based or coaxial cable-based VOD systems use a separate transmission line to send upstream control information from the subscribers. In this case, each subscriber connection requires two communication channels for the upstream and downstream transmissions. Such systems require rather large capital investment and are not economical at all.

As described above, in any conventional methods to realize an asymmetric bidirectional data transmission, large-scale equipment is inevitable. To solve this problem, it is important to develop a system that allows an asymmetric bidirectional data transmission in more economical way, fully using the existing transmission line. Moreover, the development of bidirectional data transfer techniques using a single transmission line will also contribute to finding an economical way to use an optical fiber cable for sending information to subscribers.

SUMMARY OF THE INVENTION

Taking the above into consideration, an object of the present invention is to provide a method of bidirectional data transmission over a single transmission line by using a time-compression multiplexing technique to allow a downstream channel capacity to be higher than an upstream channel capacity.

Another object of the present invention is to provide a system for bidirectional data transmission over a single transmission line by using a time-compression multiplexing technique to allow a downstream channel capacity to be higher than an upstream channel capacity.

To accomplish the above objects, according to the present invention, there is provided a method of bidirectional data transmission in a time-compression multiplexed communications system in which a master unit offers an information providing service to a slave unit over a single transmission line. The method comprises the step of setting a downstream data rate, at which data is sent from the master unit to the slave unit, to be higher than an upstream data rate, at which data is sent from the slave unit to the master unit.

In this method, the step of setting the downstream data rate is achieved by scheduling a burst cycle so that a downstream signal transmission time is set to be longer than an upstream signal transmission time.

There is also provided a bidirectional data transmission system using a time-compression multiplexing method over a single transmission line. This system comprises a master unit and a slave unit. The master unit is connected at one end of the transmission line and sends downstream transmission data at a downstream data rate higher than an upstream data rate at which said master unit receives incoming data over the transmission line. The slave unit is connected at the other end of the transmission line and sends upstream transmission data at the upstream data rate.

Further, there is provided another bidirectional data transmission system comprising a master unit and a slave unit. The master unit is connected at one end of the transmission line, in which a burst cycle time and a signal stop time are defined so that a downstream signal transmission time be given by subtracting the signal stop time from the burst cycle time, and sends downstream transmission data within the downstream signal transmission time. The slave unit is connected at the other end of the transmission line and sends upstream transmission data within the transmission stop time.

The above and other objects, features and advantages of the present invention will become apparent from the following description when taken in conjunction with the accompanying drawings that illustrate preferred embodiments of the present invention by way of example.

BRIEF DESCRIPTION OF THE DRAWINGS

FIGS. 7(A) and 7(B) are diagrams respectively showing structure of a downstream and upstream transmission data frames;

FIGS. 11(A) and 11(B) are diagrams respectively showing structure of a downstream and upstream transmission data frames in the bidirectional data transmission system in which the number of subchannels is changed according to the downstream channel capacity;

DESCRIPTION OF THE PREFERRED EMBODIMENTS

Several embodiments of the present invention will be described below with reference to the drawings.

Figure 1:
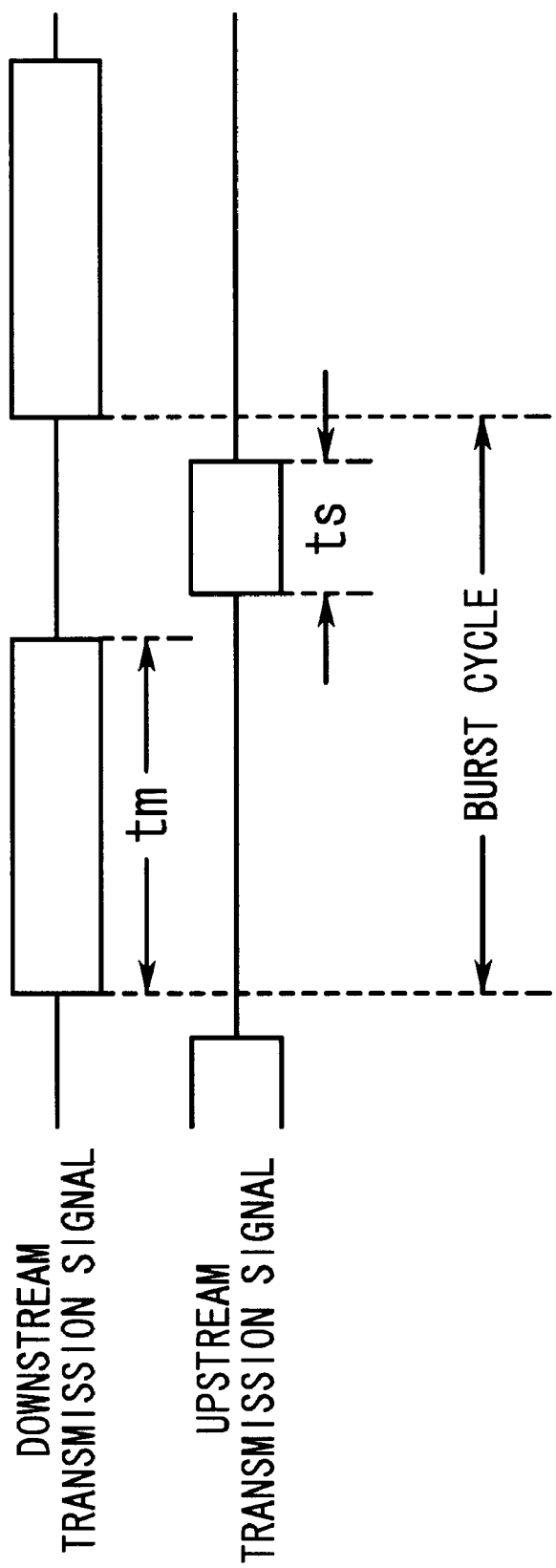
FIG. 1 is a first conceptual view of the present invention.

FIG. 1 is a first conceptual view of the present invention. In each burst cycle, a downstream transmission data frame (i.e., a bit stream of transmission data from the master unit to the slave unit) and an upstream transmission data frame (i.e., a bit stream of transmission data from the slave unit to the master unit) are outputted in turn. The burst cycle begins with the downstream transmission data frame and it lasts for transmission time, tm, spending more than half of the cycle time. When the slave unit receives the downstream transmission data frame from the master unit, it waits a guard time and starts to send the upstream transmission signal. The transmission time, ts, for the upstream transmission data frame is less than the downstream transmission time tm.

According to the above-described configuration, the amount of data transferred in the downstream direction per unit time is larger than that in the upstream direction. In other words, the downstream data rate is higher than the upstream data rate. Thus the master unit, which serves as an information service provider delivering various kinds of information including video data, can send more on the same single transmission line, thereby allowing the subscribers to receive the video data in better quality.

The above discussion assumes a constant value for the "data signaling rate" that denotes the speed of output signals derived from a clock frequency used for the data transmission. In reality, however, the time available for the data transmission is somewhat limited because the data transmission line is half duplex, which means inability of simultaneous two-way transmission, as well as being reduced due to necessity of some guard time between data frames. Therefore, the term "data rate" is used to express the net data transfer rate at which information is transferred in such a limited period.

Figure 2:
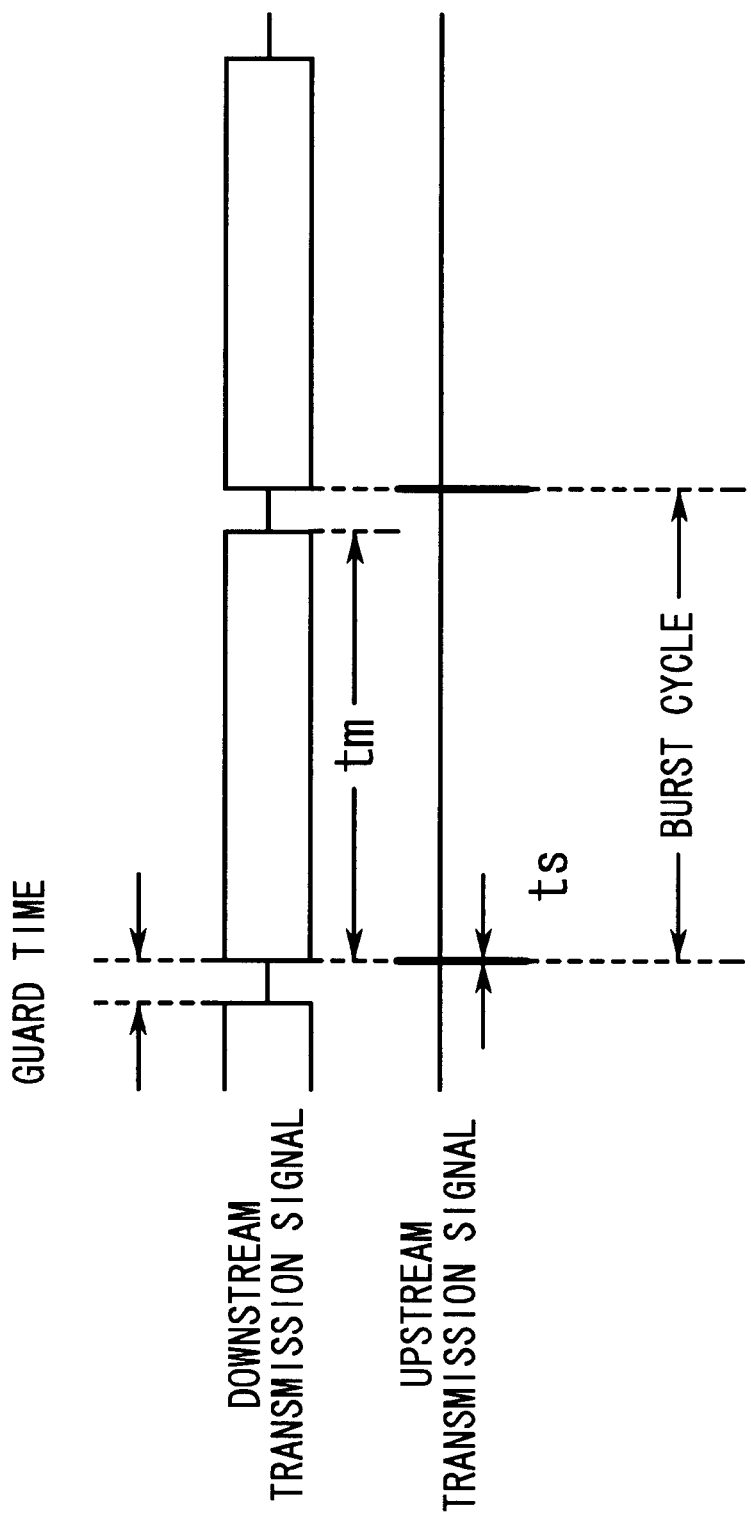
FIG. 2 is a second conceptual view of the present invention.

FIG. 2 is a second conceptual view of the present invention, showing that the downstream transmission time tm is maximized. This second embodiment devotes almost all the burst cycle time to the downstream data transmission, excluding the guard time and the upstream transmission time ts that is assigned on an on-demand basis. This structure allows the downstream data transmission to use most of the potential channel capacity derived from the data signaling rate.

For an enhanced configuration, it is possible to construct the system so that the ratio between the downstream transmission time tm and the upstream transmission time ts may be arbitrarily variable. For example, the master unit may have a function to change the rate and execute it upon request from the slave unit. In some cases, the upstream transmission time ts may be set longer than the downstream transmission time tm to allow the upstream channel to have a higher capacity.

Figure 3:
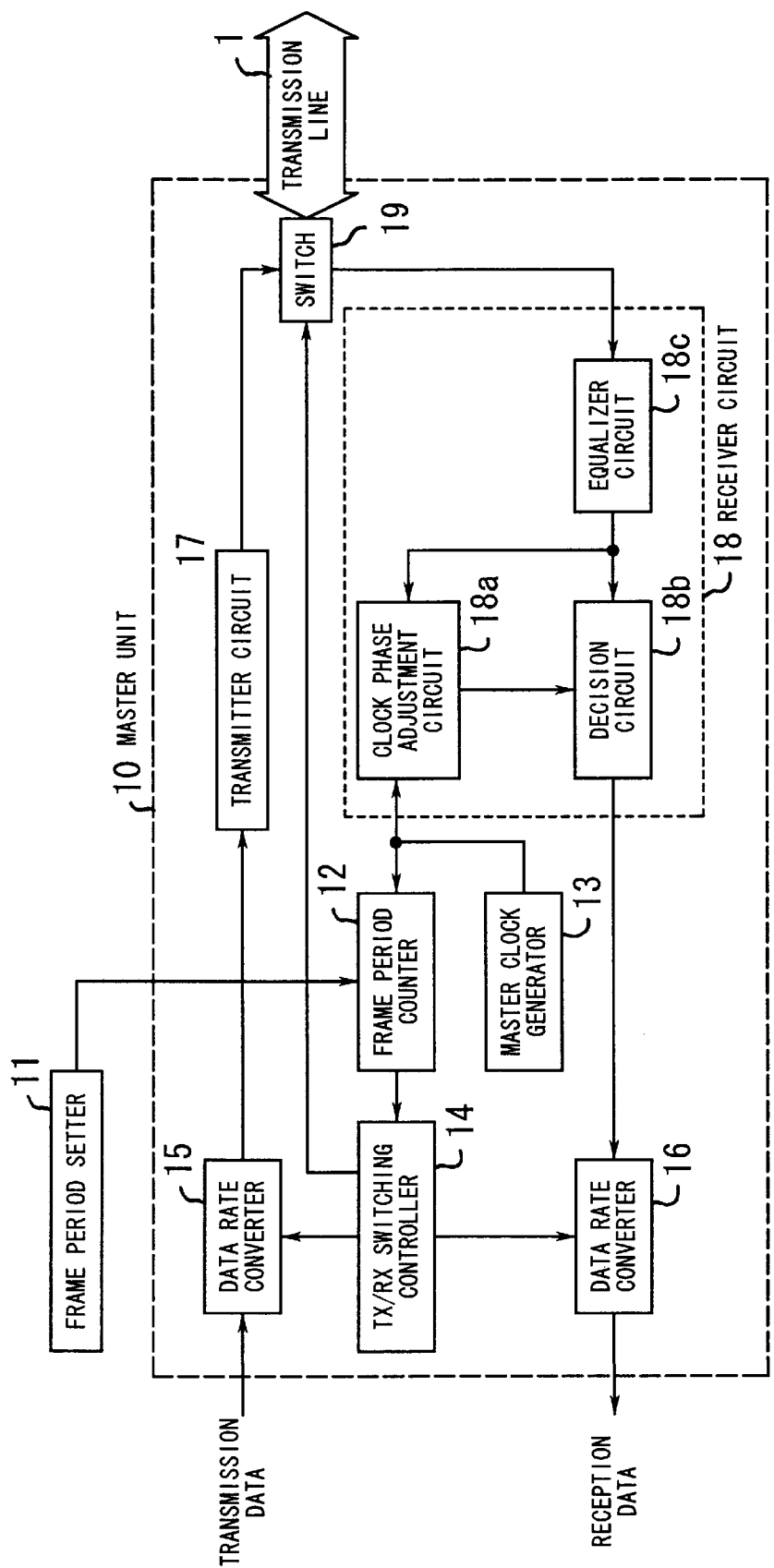
FIG. 3 is a block diagram showing a master unit in which the present invention is embodied.

FIG. 3 is a block diagram showing the master unit 10 in which the present invention is embodied. A frame period setter 11 provides some parameters to define a frame period as well as the burst cycle time, where the "frame" involves special bit patterns for frame synchronization and various control information in addition to the main transmission data and the term "frame period" denotes the transmission time for one frame. The frame period defined at the master unit 10 is the downstream transmission time. The upstream transmission time, or the frame period for data transmission in the upstream direction, is obtained by subtracting the downstream transmission time from the above-defined burst cycle time, taking the guard time into account. Timing control signals for those burst cycle time and downstream transmission time are produced by a frame period counter 12 based on a clock signal from a master clock generator 13. A TX/RX switching controller 14 provides timing control of the data transmission and reception according to the burst cycle time and downstream transmission time indicated by the above timing control signals.

A data rate converter 15 increases the data signaling rate of the transmission data, from 160 kbps to 320 kbps, for example. A transmitter circuit 17 amplifies the transmission data signal accelerated by the data rate converter 15. Under the control of the TX/RX switching controller 14, a switch 19 changes over the operation mode of the master unit 10 (i.e., data transmission mode or data reception mode), alternating the direction of signal propagation over the transmission line 1.

The data signal sent from a slave unit 20 (FIG. 4) via the transmission line 1 is entered to a receiver circuit 18, which is organized by a clock phase adjustment circuit 18a, a decision circuit 18b, and an equalizer circuit 18c. The equalizer circuit 18c shapes the waveforms of the received signals to compensate for the effect of their distortion. The decision circuit 18b decides which digital level "0" or "1" the received signal represents. The clock phase adjustment circuit 18a adjusts the phase shift between the received signal and the master clock. A data rate converter 16 reduces the data signaling rate of the data from the receiver circuit 18 and outputs the reception data.

Figure 4:
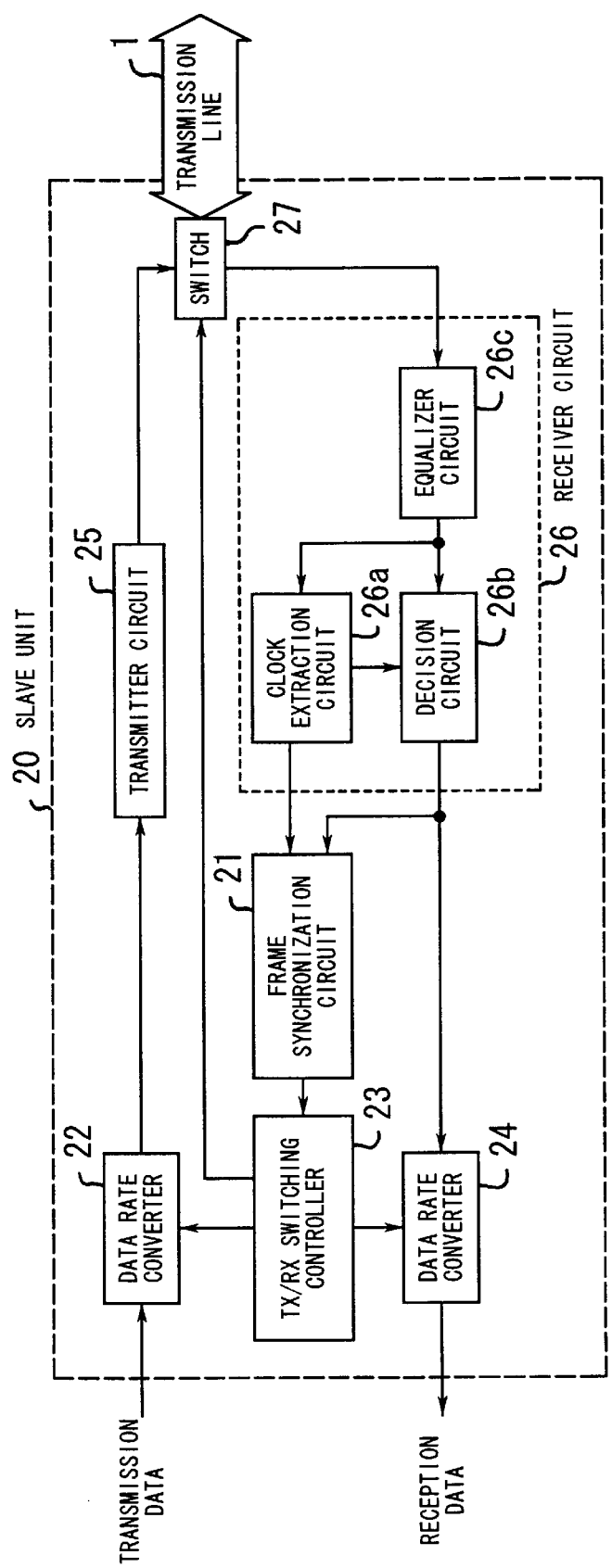
FIG. 4 is a block diagram showing a slave unit in which the present invention is embodied.

FIG. 4 is a block diagram showing the slave unit 20 in which the present invention is embodied.

The burst cycle time and the downstream transmission time set in the master unit 10 (FIG. 3) are received by a receiver circuit 26. Based on these time parameters, a frame synchronization circuit 21 recognizes the upstream frame period, or the upstream transmission time. The frame synchronization circuit 21 counts a clock to generate some timing signals to indicate the burst cycle time and the upstream transmission time. A TX/RX switching controller 23 controls switching operations between transmission and reception according to the burst cycle time and upstream transmission time indicated by those timing signals. A data rate converter 22 steps up the data signaling rate of the transmission data. A transmitter circuit 25 amplifies the transmission data signal accelerated by the data rate converter 22. Under the control of the TX/RX switching controller 23, a switch 27 changes over the operation mode of the slave unit 20 (i.e., data transmission mode or data reception mode), alternating the direction of signal propagation over the transmission line 1.

The data signal sent from the master unit 10 via the transmission line 1 is entered to a receiver circuit 26, which is organized by a clock extraction circuit 26a, a decision circuit 26b, and an equalizer circuit 26c. The equalizer circuit 26c shapes the waveforms of the received signals to compensate for their distortion effects. The decision circuit 26b decides which digital level "0" or "1" the received signal represents. The clock extraction circuit 26a extracts a timing signal from the received data signals and supplies it to the frame synchronization circuit 21. The frame synchronization circuit 21 makes frame synchronization using this timing signal to determine the transmission time for the data transmission from the slave unit 20. A data rate converter 24 steps down the data signaling rate of the signals from the receiver circuit 26 and outputs the reception data.

According to the present invention, a bidirectional data transmission system with a single transmission line is constructed by the above-described master unit 10 and slave unit 20 shown in FIGS. 3 and 4, respectively. To perform a data transmission in this system, it is necessary to preset the burst cycle time and the downstream frame period to the frame period setter 11. The frame period counter 12 recognizes the burst cycle time and the downstream transmission time from those preset values and counts time according to them.

The preset values of the burst cycle time and downstream transmission time are also supplied to the slave unit 20 and written into the frame synchronization circuit 21. The upstream transmission time is then calculated from the received burst cycle time and downstream transmission time, thus allowing the slave unit 20 to recognize the upstream transmission time as well as the burst cycle time.

At the beginning of the burst cycle, the switch 19 in the master unit 10 selects the data transmission mode and the switch 27 in the slave unit 20 selects the data reception mode. Upon elapse of the downstream transmission time after the downstream transmission frame has started, the switch 19 in the master unit 10 changes to the data reception mode, and at the same time, the switch 27 in the slave unit 20 changes to the data transmission mode.

In the way described above, the master unit can arbitrarily set the channel capacity in both the upstream and downstream directions. However, the downstream channel capacity is not necessarily set higher, but the upstream channel can take higher capacity if required. In addition, the system may be configured so that the frame period setter will change the preset values upon request from the slave unit.

Figure 5:
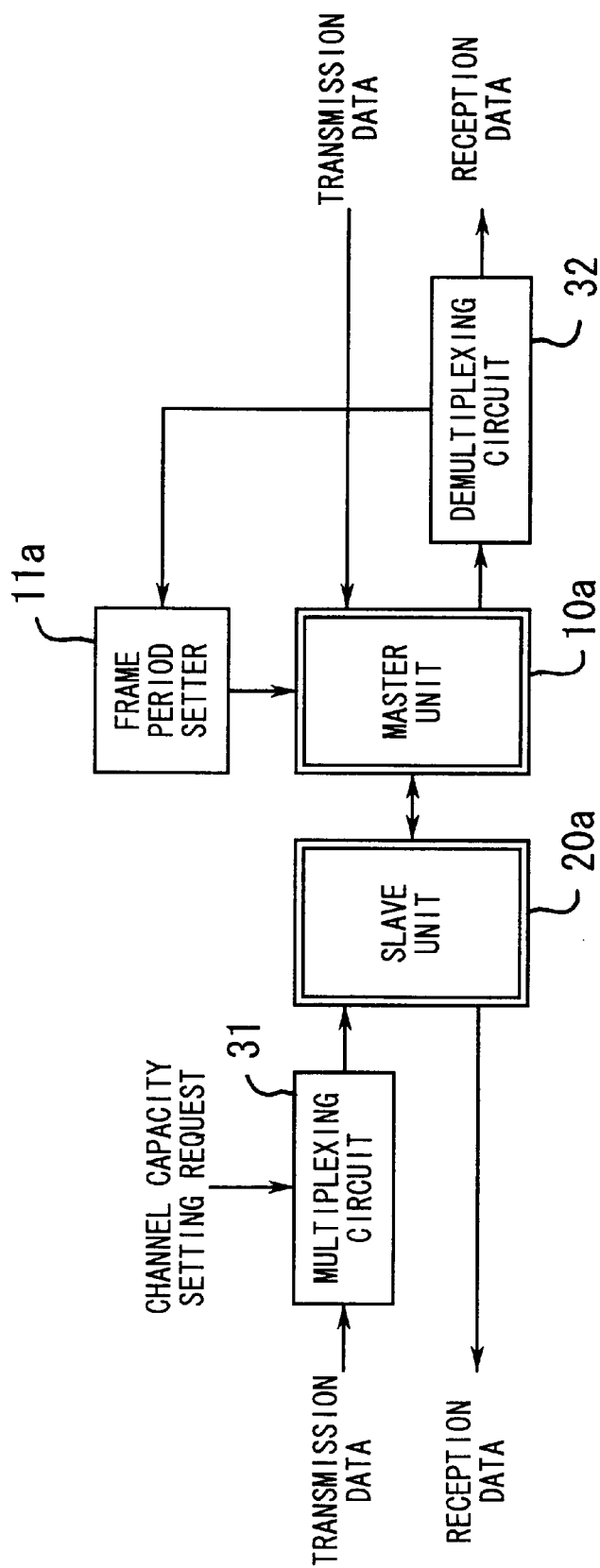
FIG. 5 is a diagram showing a bidirectional data transmission system in which a channel capacity is set upon request from the slave unit.

FIG. 5 is a diagram showing a bidirectional data transmission system in which the channel capacity can be set upon request from the slave unit. A slave unit 20a is supplied with transmission data through a multiplexing circuit 31, which combines a channel capacity setting request with the transmission data. The slave unit 20a sends those data to a master unit 10a. The master unit 10a receives the data and a demultiplexing circuit 32 then separates the channel capacity setting request from the main transmission data. The separated request is forwarded to a frame period setter 11a, where the downstream frame period is defined according to the request.

Figure 6:
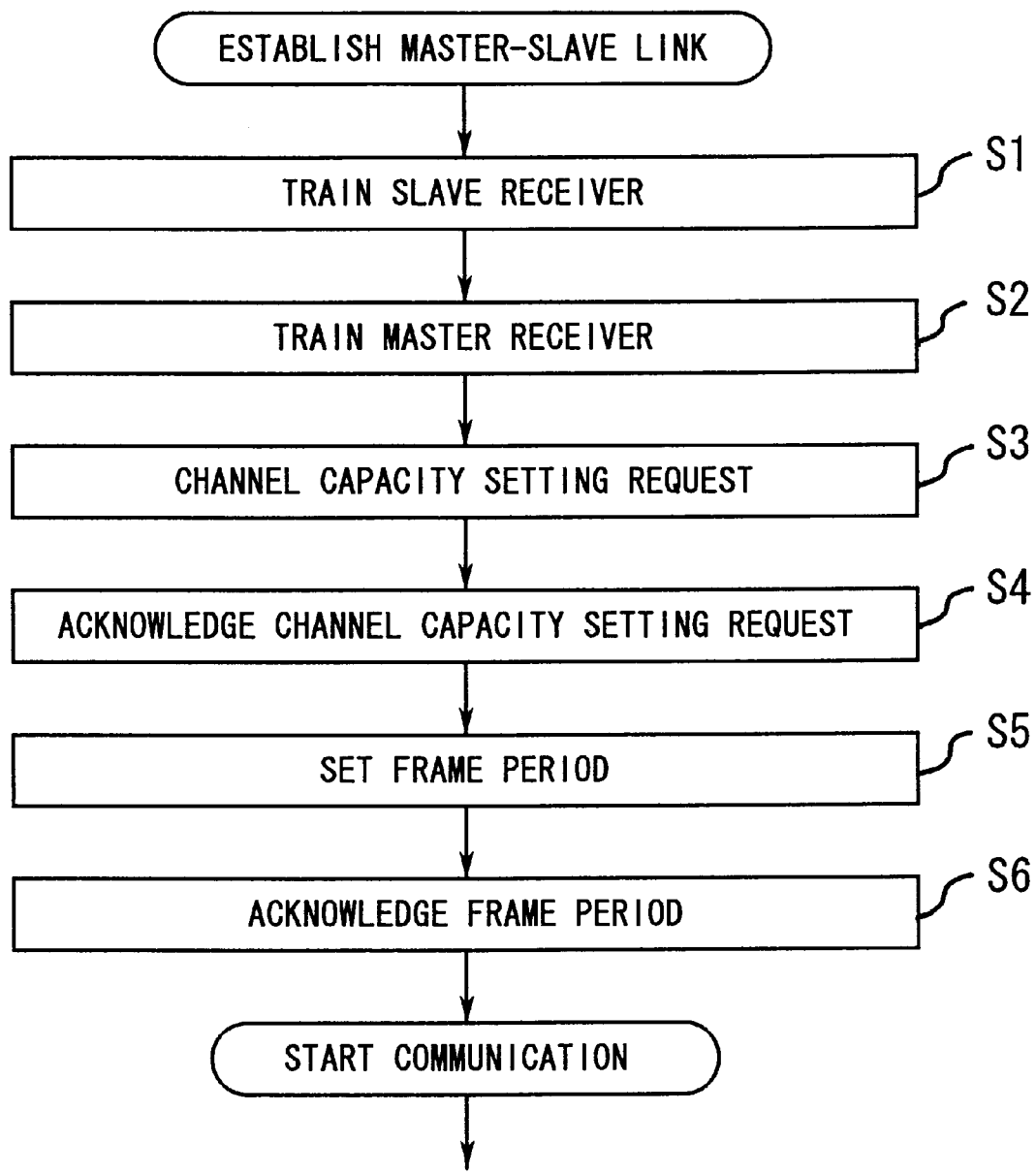
FIG. 6 is a flowchart showing a procedure to set the channel capacity upon request from the slave unit.

FIG. 6 is a flowchart showing a procedure for setting the channel capacity upon request from the slave unit. Note that the procedure described in this flowchart starts when a link is established between the master unit and the slave unit.

[S1] Upon reception of training signals from the master unit, the receiver circuit in the slave unit begins training itself. The term "training" means a sequence of operations such as: receiving the training signals, extracting parameters from them, and setting the parameters to the receiver circuit itself. This training sequence allows the receiver circuit to become ready for receiving incoming data over the transmission line.

[S2] The master unit also performs the training sequence for its receiver circuit.

[S3] The slave unit combines a channel capacity setting request and the main transmission data using a multiplexer and sends them to the master unit.

[S4] The master unit identifies the channel capacity setting request.

[S5] The master unit presets the frame period according to the channel capacity setting request.

[S6] The slave unit identifies the frame period that is preset in the master unit and programs it in a frame synchronization circuit integrated therein.

FIGS. 7(A) and (B) are diagrams respectively showing structure of a downstream and upstream transmission data frames. Both frames consist of frame synchronization bits, housekeeping bits, and a transmission data field, arranged in this order. The frame synchronization bits serve as a special bit stream to be used by the receiver circuits to establish the synchronization of each frame. The housekeeping bits convey data for maintenance, supervision, and control. As FIGS. 7(A) and 7(B) indicate, both transmission frames include the same number of bits for the frame synchronization and housekeeping purposes, however, the transmission data field of the downstream transmission data frame is longer than that of the upstream transmission data frame so as to carry more data therewith.

In the way described above, the slave unit can change the channel capacity settings in the upstream and downstream directions. When this type of bidirectional data transmission system is used as the communication channel for a VOD system, the quality of video and kinds of data services will be completely controllable by the subscribers, thus allowing the subscribers to get information as they desire in an "on-demand" basis.

Figure 8:
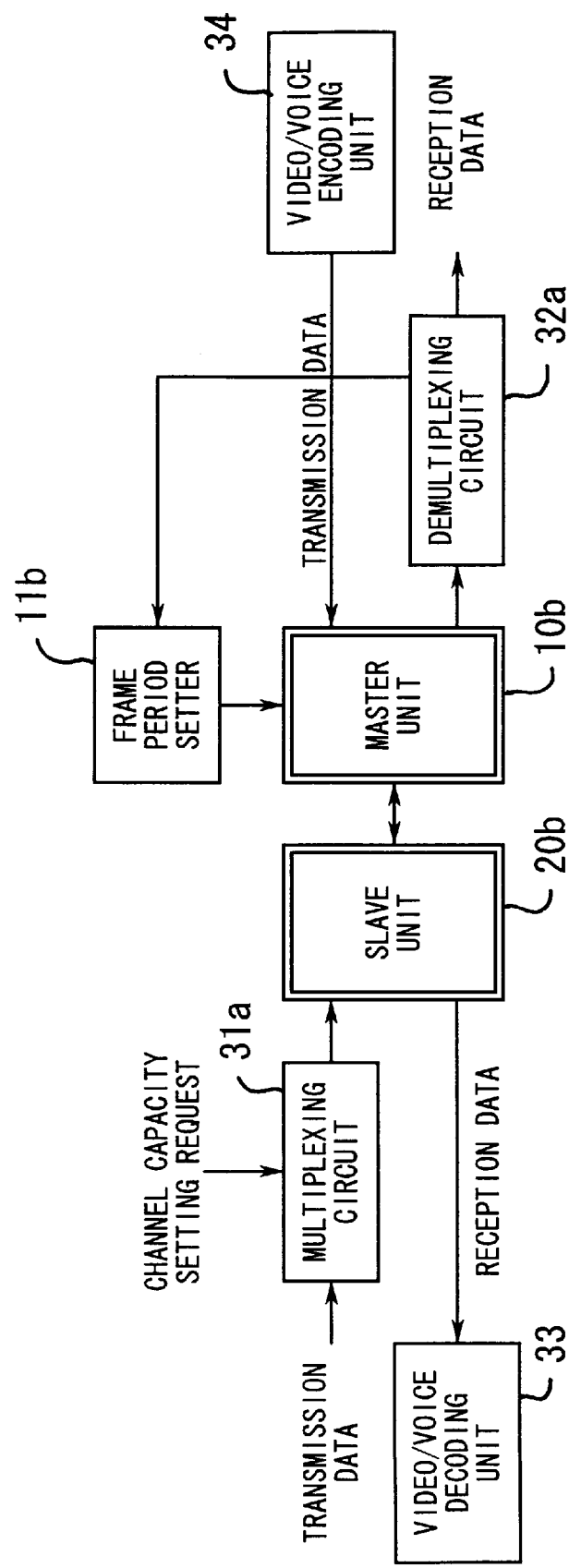
FIG. 8 is a diagram showing a bidirectional data transmission system in which a video quality is changed according to a downstream channel capacity.

FIG. 8 is a diagram showing a bidirectional data transmission system in which the quality of video image can be changed according to the downstream channel capacity. A multiplexing circuit 31a combines transmission data and a channel capacity setting request into a single bit stream of transmission data. A slave unit 20b transfers this multiplexed data to a master unit 10b. A demultiplexing circuit 32a demultiplexes the data received by the master unit 10b and splits off the channel capacity setting request from the received data. The obtained channel capacity setting request is forwarded to a video/voice encoding unit 34 as well as to a frame period setter 11b. With the encoding rates determined by the channel capacity setting request, the video/voice encoding unit 34 performs data compression and encoding for the video and voice data to be transmitted. The frame period setter 11b determines the downstream frame period according to the channel capacity setting request. The encoded video/voice data is transferred to the slave unit 20b and then decoded by a video/voice decoding unit 33.

Subscribers can select the quality of video data in the way described above. For instance, when a subscriber tries to communicate interactively with an information service provider, he/she can increase the upstream channel capacity to some extent, although the video quality is degraded. In contrast, when it is not necessary to send much information to the service provider, as when watching movie films, the subscriber can enjoy high quality video by increasing the downstream channel capacity. Further, introduction of the MPEG (Motion Picture Experts Group) standard encoding methods into this data transmission system will provide more realistic solution for the video information service using the existing subscriber loops.

Figure 9:
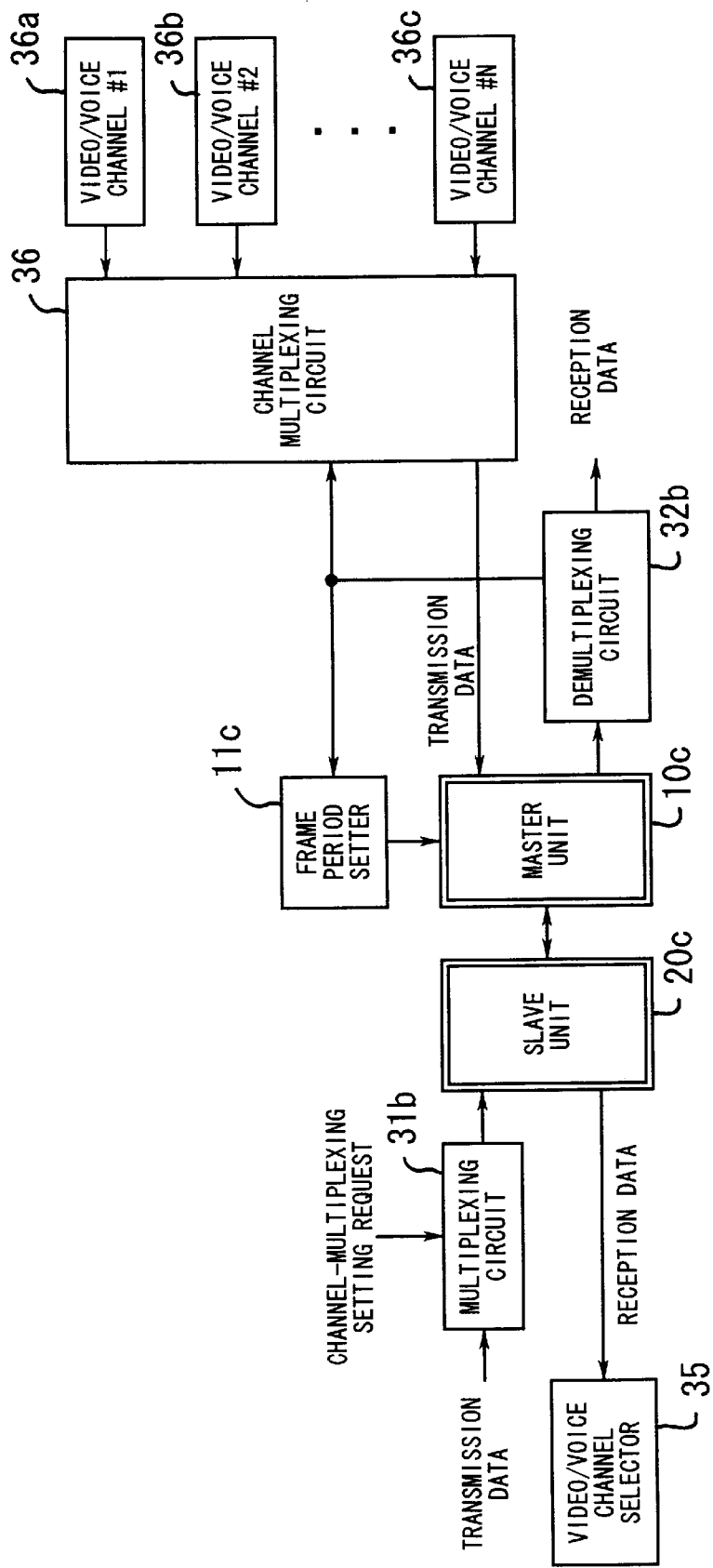
FIG. 9 is a diagram showing a bidirectional data transmission system in which the number of subchannels is changed according to the downstream channel capacity.

FIG. 9 is a diagram showing a bidirectional data transmission system in which the downstream channel is divided into a plurality of subchannels and the number of subchannels can be changed according to the downstream channel capacity. A multiplexing circuit 31b combines transmission data and a channel-multiplexing setting request into a single data stream. A slave unit 20c transfers this combined data to a master unit 10c. The slave unit 20c in turn receives data from the master unit 10c in multiplexed form, and this received data containing multiple subchannel signals is supplied to a video/voice channel selector 35. By demultiplexing the received data, the video/voice channel selector 35 can select any one of the subchannel signals.

On the master side, a demultiplexing circuit 32b demultiplexes data received by the master unit 10c and splits off the channel-multiplexing setting request from the received data. The obtained channel-multiplexing setting request is forwarded to a channel multiplexing circuit 36 as well as to a frame period setter 11c. The channel multiplexing circuit 36 controls a plurality of video/voice channels 36a–36c and subdivides the downstream channel into a plurality of subchannels as many as designated by the channel-multiplexing setting request, thus outputting the transmission data containing several different video/voice data. A frame period setter 11c determines the downstream frame period suitable for the number of subchannels designated by the channel-multiplexing setting request.

Figure 10:
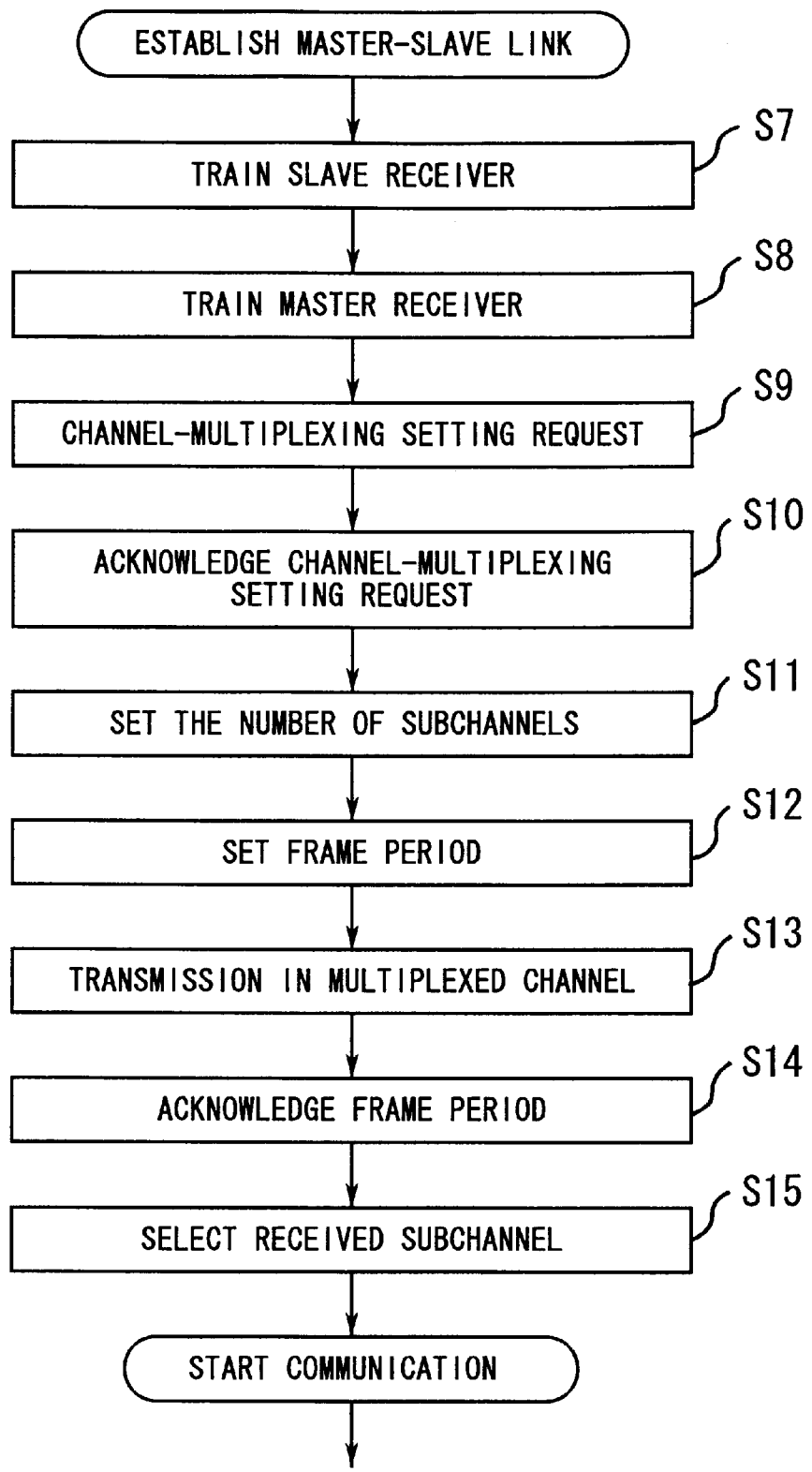
FIG. 10 is a flowchart showing a procedure to change the number of subchannels according to the downstream channel capacity.

FIG. 10 is a flowchart showing a procedure for changing the number of subchannels according to the downstream channel capacity. Note that the procedure in this flowchart starts when a link is established between the master unit and the slave unit.

[S7] The slave unit receives training pulse signals from the master unit to set various parameters and makes itself ready to receive data.

[S8] In turn, the master unit receives training pulse signals from the slave unit to set various parameters and makes itself ready to receive data.

[S9] The slave unit outputs a channel-multiplexing setting request, which is combined with the transmission data signals by the multiplexing circuit 31b shown in FIG. 9.

[S10] In the master unit, the demultiplexing circuit 32b splits off the channel-multiplexing setting request and the channel multiplexing circuit 36 accepts it.

[S11] The channel multiplexing circuit 36 in the master unit sets the number of subchannels as designated by the channel-multiplexing setting request. This number of subchannels derives the downstream channel capacity because the necessary capacity per subchannel is predetermined.

[S12] In the master unit, the frame period setter 11c determines the frame period suitable for the number of subchannels.

[S13] The master unit transmits all the data assigned to the respective subchannels over the multiplexed downstream channel.

[S14] The slave unit recognizes the frame period set in the frame period setter 11c.

[S15] The video/voice channel selector 35 in the slave unit selects one of the subchannels provided through the multiplexed downstream channel.

FIGS. 11(A) and 11(B) are diagrams respectively showing structure of a downstream and upstream transmission data frames in the bidirectional data transmission system in which the number of subchannels is changed according to the downstream channel capacity. The downstream transmission data frame consists of frame synchronization bits, housekeeping bits, and a plurality of data fields, arranged in this order. On the other hand, the upstream transmission data frame consists of frame synchronization bits, housekeeping bits, and a single field for transmission data. FIG. 11(A) shows that the downstream frame contains the data fields as many as the slave unit has designated in the channel-multiplexing setting request.

In the way described above, with increased downstream channel capacity, the subscribers can receive a plurality of video/voice channels and take their choice out of the channels.

Figure 12:
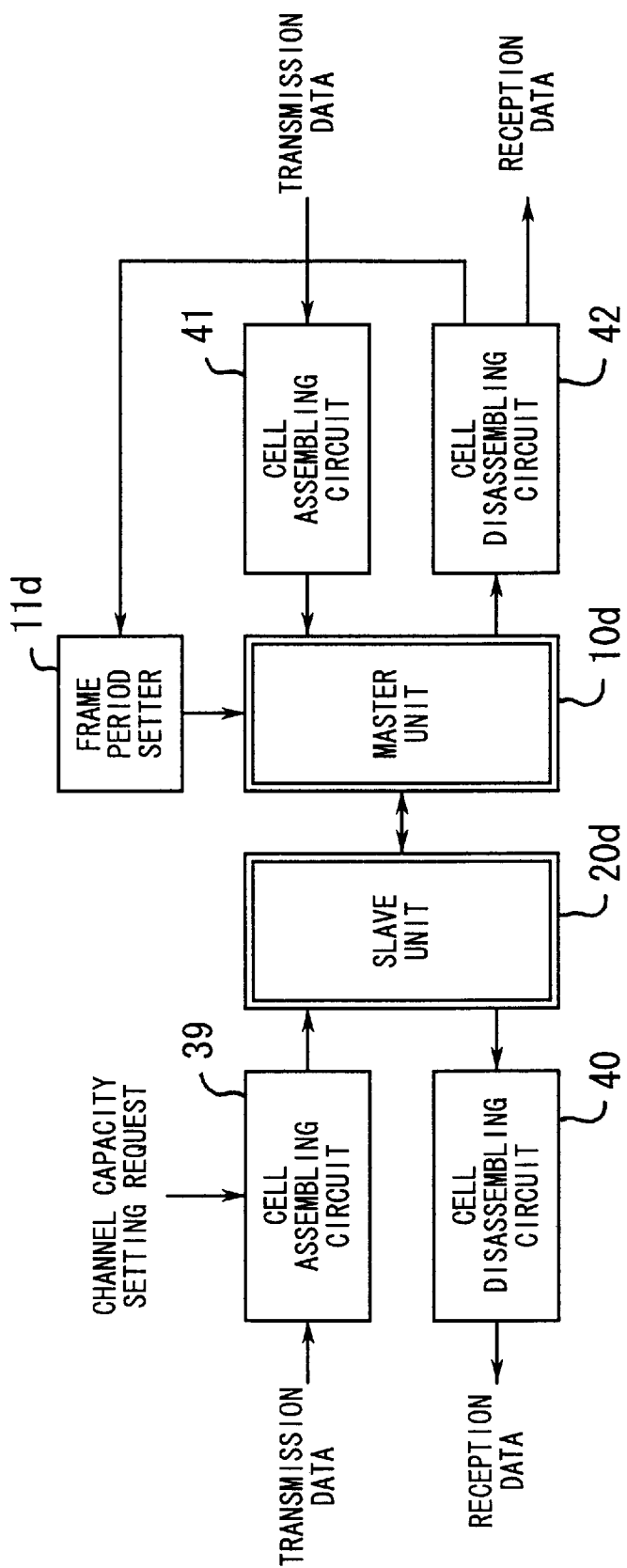
FIG. 12 is a diagram showing a bidirectional data transmission system in which the transmission data is broken into cells for data transfer.

FIG. 12 is a diagram showing a bidirectional data transmission system that transfers transmission data in the form of small cells. A cell assembling circuit 39 in a slave unit 20d breaks transmission data and a channel capacity setting request into fixed-length data cells (or packets) and supplies them to the slave unit 20d for transmission. In turn, data cells received by the slave unit 20d is reassembled by a cell disassembling circuit 40 and outputted as a continuous data stream.

Likewise, in a master unit 10d, a cell assembling circuit 41 converts transmission data into fixed-length data cells and a cell disassembling circuit 42 reconverts the received data cells to a continuous data stream. After that reconversion, the channel capacity setting request is extracted and supplied to a frame period setter 11d. The above-described configuration allows the data to be transferred in the form of cells.

Figure 13:
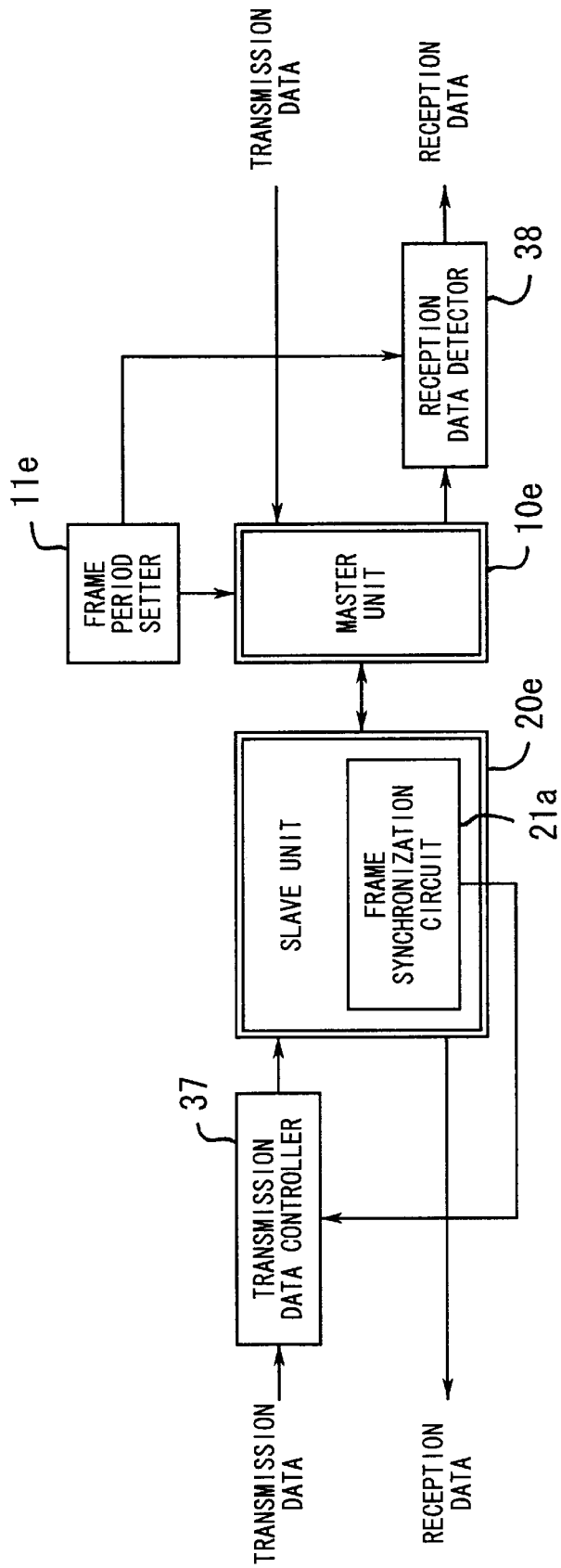
FIG. 13 is a diagram showing a bidirectional data transmission system in which upstream transmission signals are sent within a downstream signal stop time.
Figure 14:
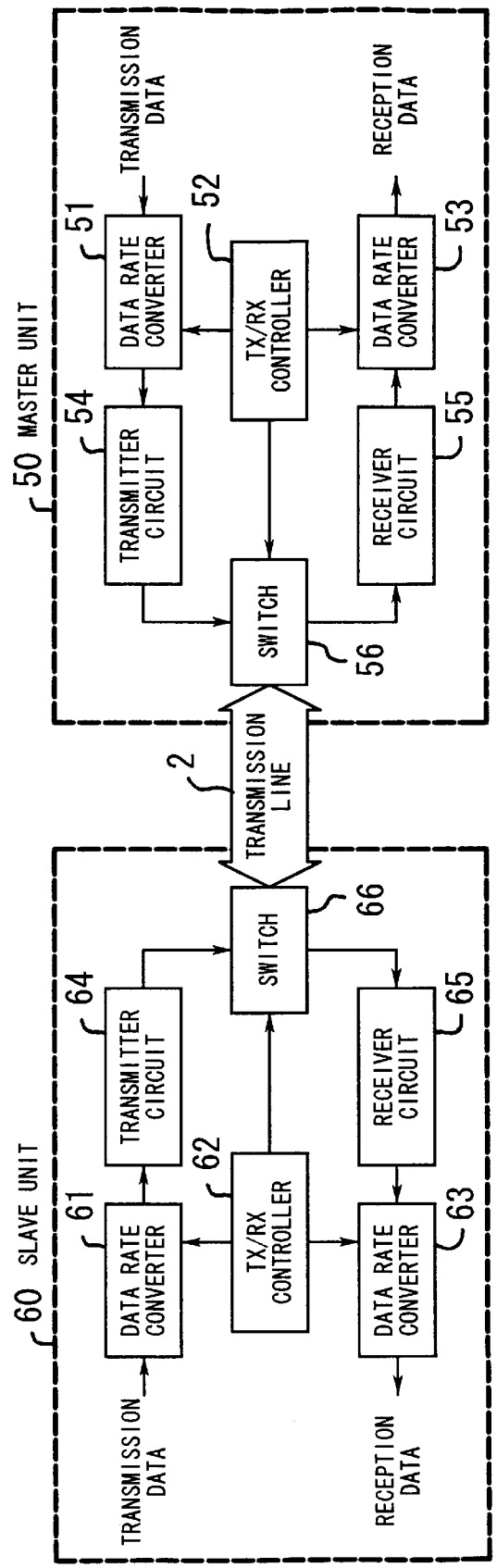
FIG. 14 is a block diagram showing a basic structure of the ping-pong transmission system used in ISDN.
Figure 15:
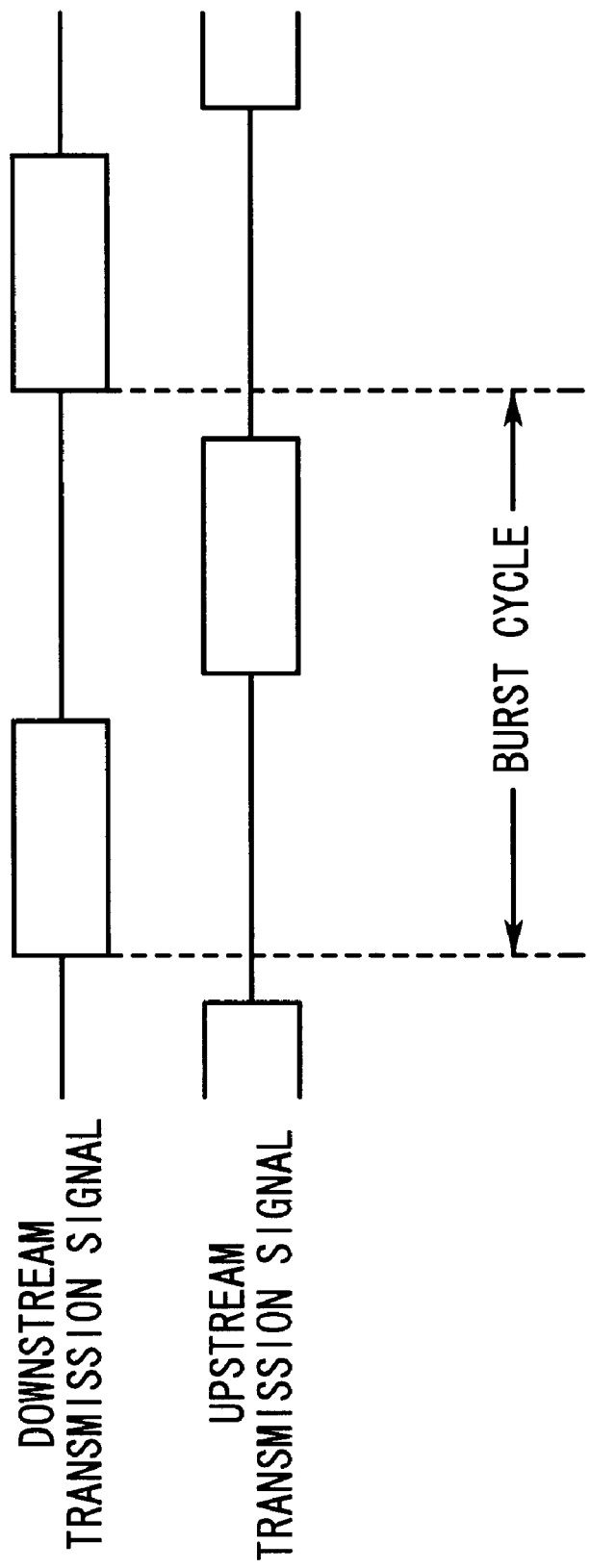
FIG. 15 is a diagram showing transmission signals in the ping-pong transmission system.

FIG. 13 shows a bidirectional data transmission system in which upstream transmission signals are sent during a signal stop time predefined for the downstream data transmission. In a frame period setter 11e on the master side, a frame sequence is scheduled such that the data transmission stops for a predetermined period ("signal stop time") once in a predetermined cycle time. A master unit 10e transmits signals over the downstream channel according to the frame schedule programmed in the frame period setter 11e. On the other hand, a frame synchronization circuit 21a integrated in the slave unit 20e detects the frame period and signal stop time. A transmission data controller 37 outputs transmission data within the detected signal stop time. The master unit 10e is equipped with a reception data detector 38 that only accepts the reception signal during the signal stop time scheduled in the frame period setter 11e.

The configuration shown in FIG. 13 may be applied to a case such that the subscriber has few chances to use the upstream channel to communicate with the information service provider, such as sending a short command message or the like. In this case, the subscriber's message is sent during the signal stop time between the downstream frames. Thus the downstream data transmission can use almost all the time available in a burst cycle.

The signal stop time may be set as short as the guard time that is taken between the data bursts in the time-compression multiplexing method. In this case, the transmission time reserved for the downstream channel equals the time obtained by subtracting the guard time and the upstream data transmission time from the burst cycle time.

The above description will be summarized as follows. According to the present invention, application systems such as the VOD services can obtain higher capacity for the downstream data transmission, thus enabling high-quality video information to be delivered through a single transmission line. In other words, since the present invention allocates most of the channel capacity to the downstream direction to satisfy the VOD's channel requirement, high-quality video information can be delivered to the subscribers. Because its high performance is achieved only by changing each length of the upstream and downstream frame periods without increasing the hardware complexity, the present invention will provide more economical and realistic solution for the advanced information services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of bidirectional data transmission in a time-compression multiplexed communication system in which a master unit offers an information providing service to a slave unit over a single transmission line, the single transmission line allowing half-duplex communication at a constant data signaling rate, the method comprising the step of:

setting substantially a downstream data rate of the half-duplex communication to be higher than an upstream data rate by scheduling a burst-cycle of half-duplex communication so that a downstream signal transmission time, during which data is sent from the master unit to the slave unit, is set to be longer than an upstream signal transmission time, during which data is sent from the slave unit to the master unit.

2. A bidirectional data transmission system using a time-compression multiplexing method, comprising:

a single transmission line allowing half-duplex communication at a constant data signaling rate;

a master unit, connected to one end of the single transmission line, which sends downstream transmission data at a downstream data rate higher than an upstream data rate at which said master unit receives incoming data over said single transmission line, wherein said downstream and upstream data rates are sent by scheduling a burst cycle of half-duplex communication so that a downstream signal transmission time, during which data is sent from the master unit to the slave unit, is set to be longer than an upstream signal transmission time, during which data is sent from the slave unit to the master unit; and a slave unit, connected at the other end of the single transmission line, which sends upstream transmission data at the upstream data rate.

3. A bidirectional data transmission system using a time-compression multiplexing method, comprising:

a single transmission line allowing half-duplex communication at a constant data signaling rate;

a master unit, connected at one end of said single transmission line, which allows a burst cycle time and a downstream signal transmission times, for sending data within the burst cycle times, to be programmed therein and sends downstream transmission data during the downstream signal transmission time; and a slave unit, connected at the other end of said single transmission line, which sends upstream transmission data using an upstream signal transmission time obtained by subtracting the downstream signal transmission time from the burst cycle time.

4. A bidirectional data transmission system according to claim 3, further comprising:

multiplexing means for combining a channel capacity setting request designating the downstream signal transmission time and the upstream transmission data into a multiplexed data stream and supplying the multiplexed data stream to said slave unit;

demultiplexing means for extracting the channel capacity setting request from master reception data received by said master unit; and signal transmission time setting means for setting the downstream signal transmission time for said master unit as designated by said extracted channel capacity setting request.

5. A bidirectional data transmission system according to claim 4, further comprising:

encoding means for recognizing a downstream channel capacity from the channel capacity setting request provided by said demultiplexing means, and encoding video and voice data at an encoding rate depending upon the obtained downstream channel capacity so as to provide said master unit with the downstream transmission data; and decoding means for recognizing a downstream channel capacity from slave reception data received by said slave unit and decoding the slave reception data at the same rate as said encoding rate.

6. A bidirectional data transmission system according to claim 4, further comprising:

channel multiplexing means, controlling a plurality of video/voice channels for provision of video/voice information from said master unit to said slave unit, for recognizing a downstream channel capacity from the channel capacity setting request provided by said demultiplexing means, and supplying said master unit with as much of said video/voice information of the video/voice channels as allowed by the downstream channel capacity for use as the downstream transmission data; and channel selection means for selectively obtaining the video/voice information of one of the video/voice channels contained in slave reception data received by said slave unit.

7. A bidirectional data transmission system according to claim 3, further comprising:

first cell assembly/disassembly means, disposed in said master unit, for breaking master transmission data to be sent by said master unit into fixed-length cells and for combining data cells received by said master unit into an original continuous data form; and second cell assembly/disassembly means, disposed in said slave unit, for breaking slave transmission data to be sent by said slave unit into fixed-length cells and for combining data cells received by said slave unit into an original continuous data form.

8. A bidirectional data transmission system using a time-compression multiplexing method, comprising:

a single transmission line allowing half-duplex communication at a constant data signaling rate;

a master unit, connected at one end of the single transmission line, which sends downstream transmission data within a downstream signal transmission time that is obtained by subtracting a given signal stop time from a given burst cycle time of the half-duplex communication; and a slave unit, connected at the other end of the single transmission line, which sends upstream transmission data within said given transmission stop time.

* * * * *